Figure 10:
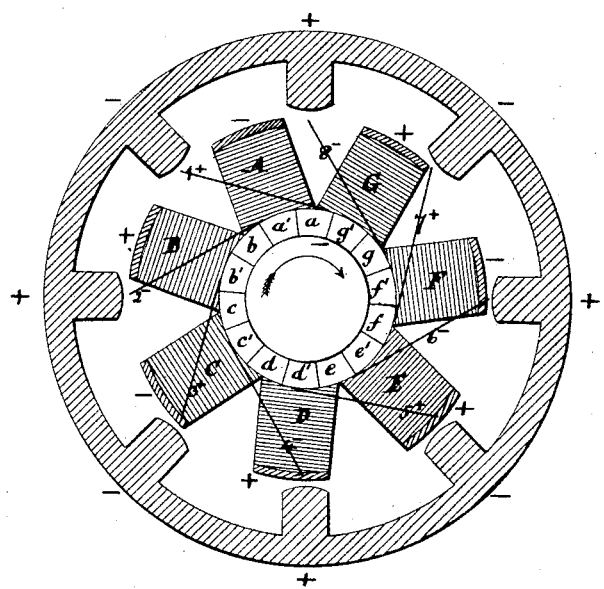

(No Model.) 4 Sheets—Sheet 1.
M. IMMISCH.
ELECTRIC MOTOR.
No. 327,797. Patented Oct. 6, 1885.
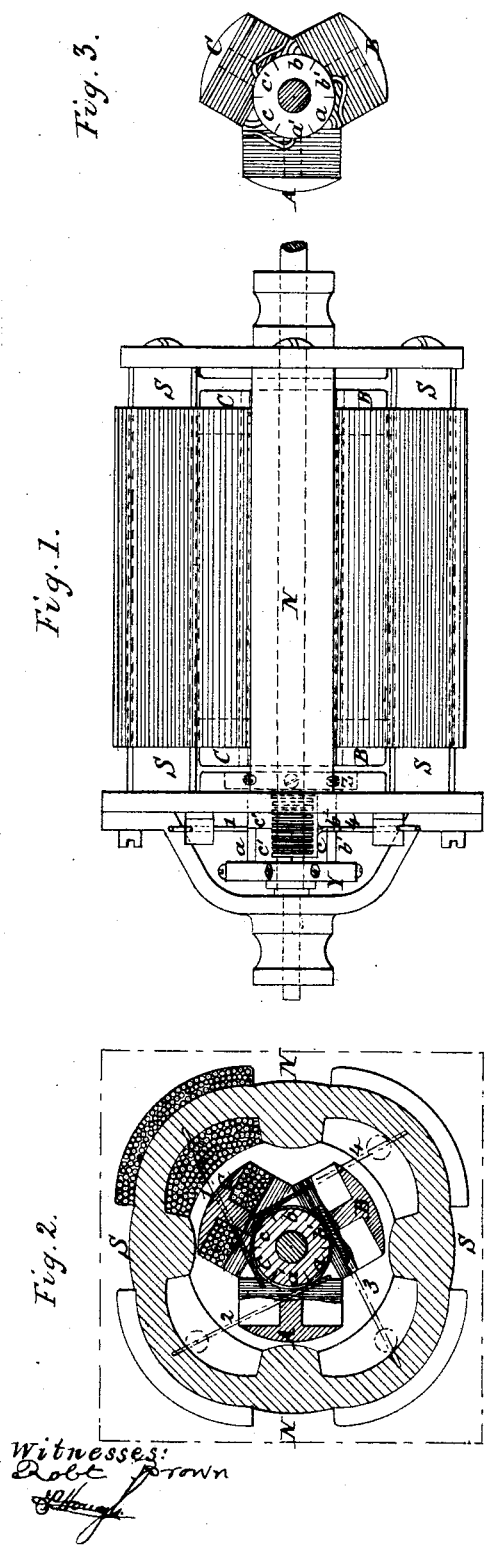
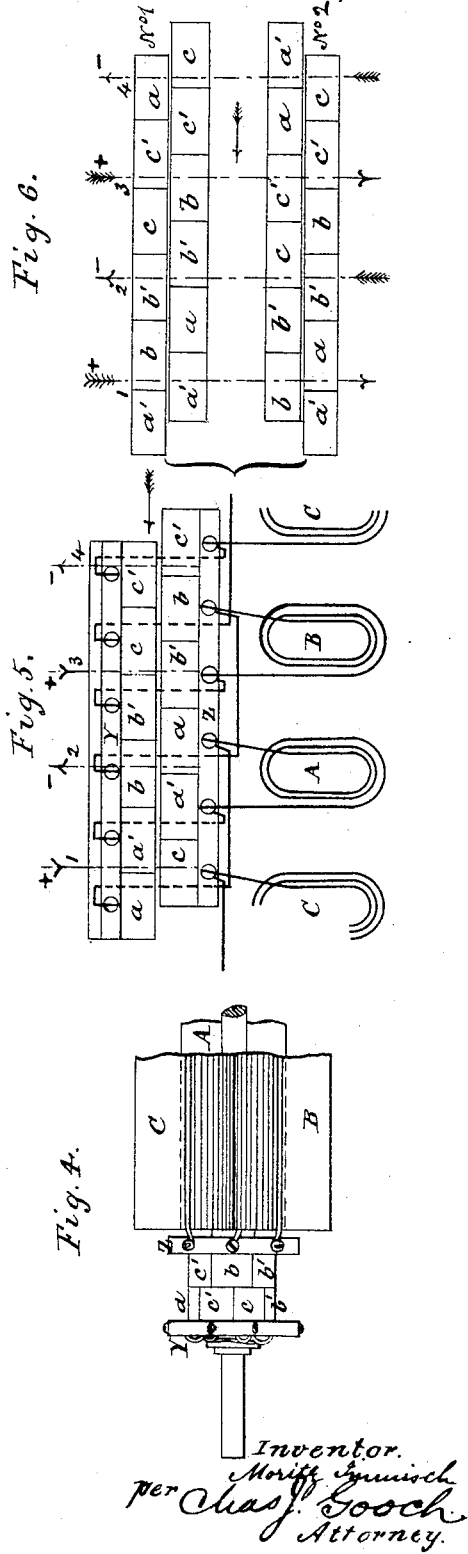
Witnesses:
Robt Brown
Inventor.
Moritz Immisch
per Chas. J. Gooch
Attorney.

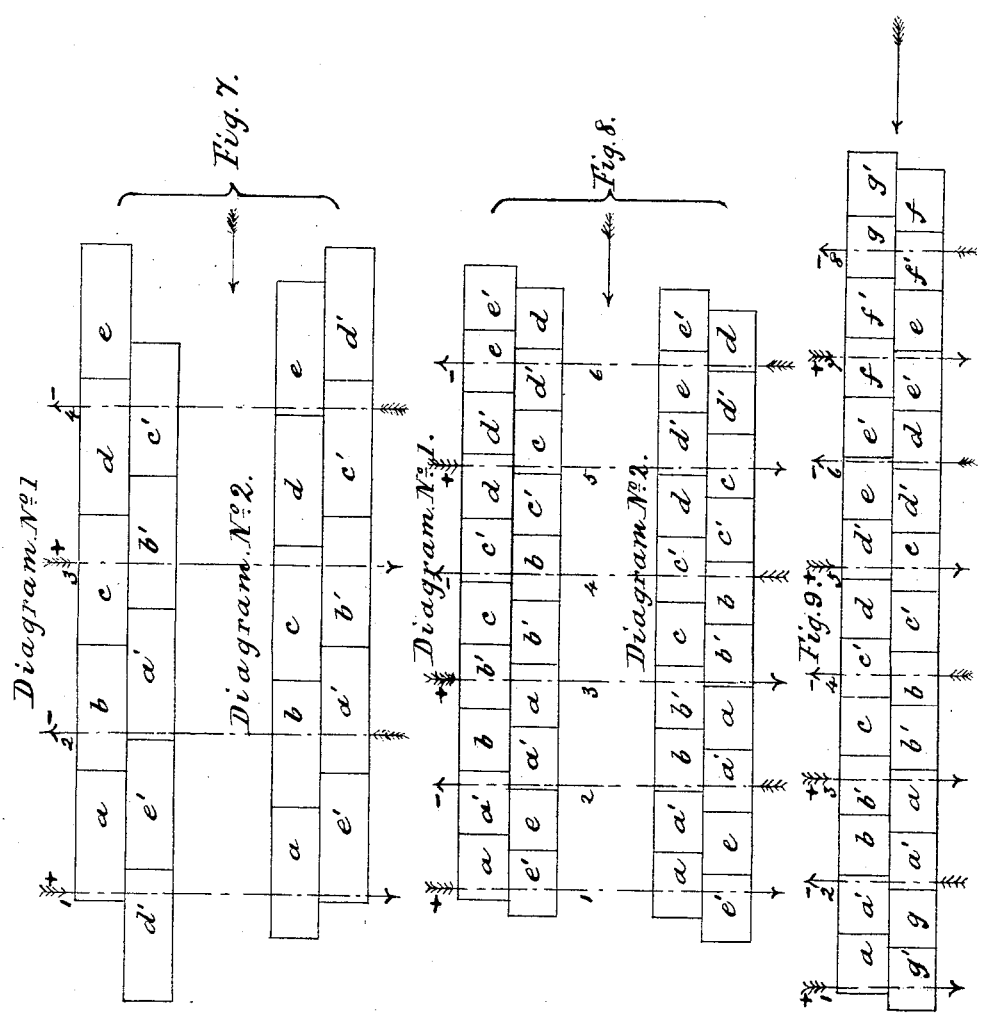

(No Model.)  4 Sheets—Sheet 3.

M. IMMISCH.
ELECTRIC MOTOR.

No. 327,797.  Patented Oct. 6, 1885.

Witnesses:
Wm. L. Allan
C. E. Jones.

Inventor.
Moritz Immisch
per Chas J. Gooch.
Attorney.

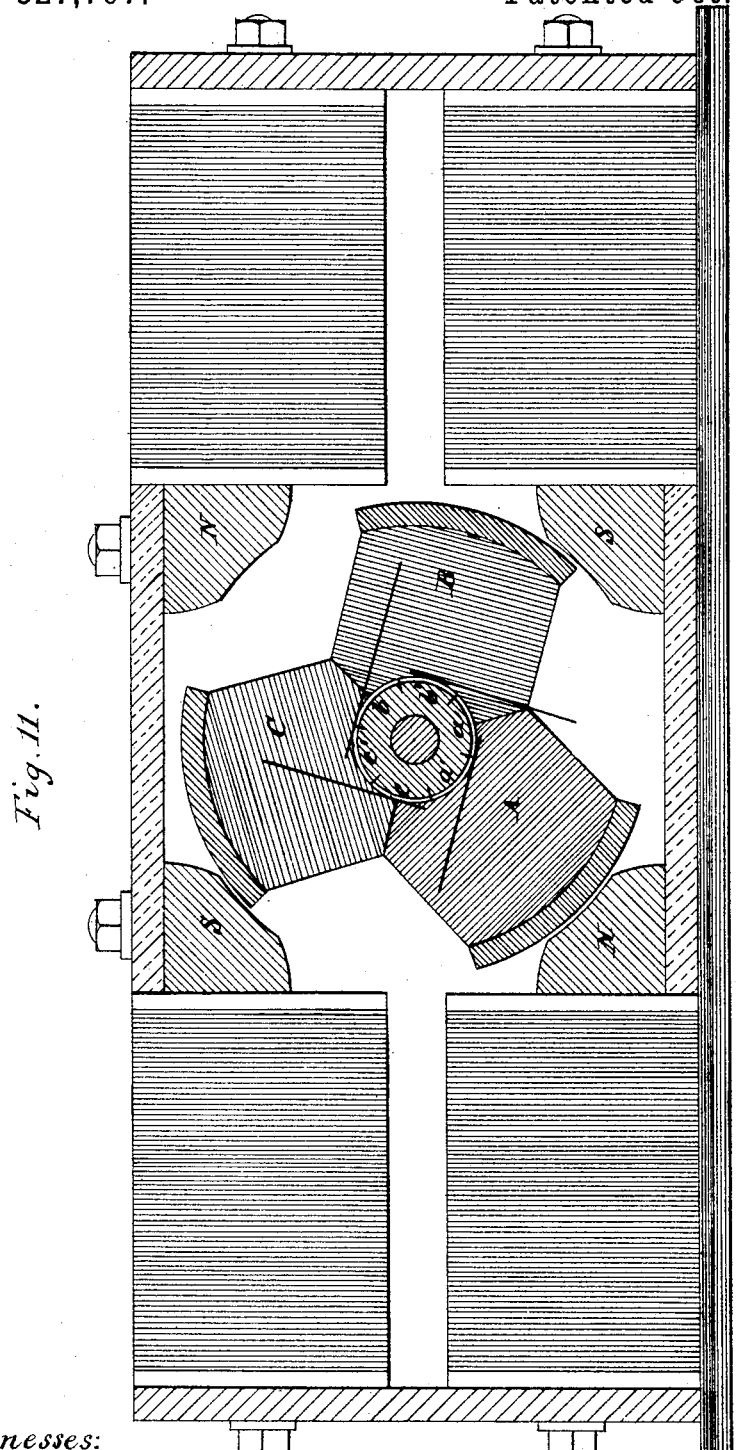

UNITED STATES PATENT OFFICE.

MORITZ IMMISCH, OF LONDON, ENGLAND.

ELECTRIC MOTOR.

SPECIFICATION forming part of Letters Patent No. 327,797, dated October 6, 1885.

Application filed January 29, 1883. Serial No. 83,690. (No model.) Patented in England September 30, 1882, No. 4,665.

*To all whom it may concern:*

Be it known that I, MORITZ IMMISCH, a subject of the Emperor of Germany, residing in the city of London, in the county of Middlesex, in the United Kingdom of Great Britain, have invented an Improved Electric Motor, (for which I have obtained a patent in England, No. 4,665, dated September 30, 1882;) and I do hereby declare the following to be a full, clear, and exact description of the same.

This invention relates to an improvement in that class of electromotors in which the number of armature-magnets is so proportioned to the number of field-magnet poles that each armature-magnet should at any given moment occupy a different place in the magnetic field as compared with the rest of the armature-coils, the object being to obtain an equal pull and uniform action.

I will first proceed to describe my invention as applied to a motor in which there are three armature-magnets of the well-known T form and field-magnets forming four pole-pieces of alternating polarity.

The coils of the armature-magnets are similarly wound, and the ends of the coils are connected with a commutator. Two pairs of contact springs or brushes are employed, one pair to lead the current to the commutator and the other pair to take it off. The commutator and brushes are so arranged that the polarity of each of the armature-magnets is changed four times in one revolution. Besides this, each of the armature-coils receives four times in one revolution a double amount of current, just when the magnets are in such a position of the magnetic field that this double current is most conducive to procure rotary motion.

The four pole-pieces may be formed of four sections of a ring. These sections may be either circular or of a horseshoe shape, the wire being wound in such a manner that alternating poles are formed in the ring; or two straight electro-magnets may be employed, their poles being placed in a like manner.

But in order that my invention may be fully understood, I will proceed to describe the same by the aid of the accompanying sheets of drawings, in which—

Figure 1 is a plan view of one form of the improved motor, and Fig. 2 is a transverse section of the same, taken partly through the field-magnets and the armature-magnets and partly through the commutator. Fig. 3 is a detail view of the armature-magnets. Fig. 4 is a side elevation of Fig. 3. Fig. 5 is a view of the commutator developed or spread out in the form of a flat band. Figs. 6, 7, 8, and 9 are respectively diagram views representing the different modes of arranging the armature-magnets and field-magnets; Fig. 10, a sectional view of a modification of my invention, in which the field-magnets have a ring form, and Fig. 11 represents another modification, partly in section.

In Fig. 2 only one of the coils of the field-magnets and one of the coils of the armature-magnets are shown in section; but it will be understood that all the field-magnets and also the armature-magnets are similarly provided with coils.

A B C are the cores of the armature-magnets. 1 2 3 4 are the brushes or contact-springs, 1 and 3 forming one pair and 2 and 4 the other pair. These brushes are in frictional contact with the commutator, consisting of twelve segments, six of which are visible in Figs. 2 and 3—viz., $a$ and $a'$, $b$ and $b'$, and $c$ and $c'$. These segments are connected to the ends of the wires of the armature-coils in the manner shown in Fig. 3, the outer ends of the coils being connected to the segments $a'$, $b'$, and $c'$, and the inner ends to the segments $a\ b\ c$. These six segments are each and singly in metallic connection with one of another series of six segments, as shown in Fig. 5, where, in order to more clearly illustrate the same, the commutator is represented as developed or spread out in the form of a flat band. It will be seen that those segments of the two series which are metallically connected with each other are indicated by similar letters in both series.

Fig. 4 is a side elevation of Fig. 3, and shows a suitable manner of constructing the commutator. The segments are laid on a cylinder of insulating material and fixed by rings Y and Z, also of insulating material. There are six screws in each ring, those in ring Y serving to press the ends of the connecting-wires against the segments, the wires themselves then passing underneath the segments, as shown by the thick dotted lines in Fig. 5, to the other side of the commutator, and are there connected to the proper segments by the screws in rings Z. The latter screws are also in connection with the ends of the armature-wires. With the exception of the metallic connections shown and above described, (and which may be effected in any other convenient manner,) the segments are well insulated from each other. Each of the brushes makes contact with the two series of segments, those brushes which lead the current to the commutator being metallically connected together, and those which take the current off being also metallically connected together. Calling brushes 1 and 3 "positive," and brushes 2 and 4 "negative," it will be seen by Fig. 2 that the current enters the commutator by two of the brushes at opposite points, and is taken off the commutator by the other two brushes.

In Fig. 5 the contacts of the brushes with the commutator are represented by the vertical lines 1 2 3 4.

It will be seen that by brushes 1 and 3 the positive current enters segments $c$, $a'$, $b'$, and $c$, and is taken by brushes 2 and 4 from segments $b$, $a$, $c'$, and $c'$. Thus magnet C is excited by double the amount of current as compared with A and B, the segments $c\,c$ being in contact with the halves of two positive brushes, and the segments $c'\,c'$ with the whole of a negative brush. Supposing the commutator to have moved toward the left one-twelfth of a revolution, the brushes remaining stationary, a positive current will then enter by the segments $a'$, $a'$, $c$, and $b$, leaving by segments $a$, $b'$, $c'$, and $a$, showing that now magnet A gets the double current, while B has changed polarity.

A further development of the changes occurring during the rotation of the commutator is shown in Fig. 6, in which diagram No. 1 represents the commutator as having moved another twelfth part of a revolution toward the left, when a double current enters coil B, while C has changed polarity. In diagram No. 2 of this same figure the commutator is shown as having again moved one-twelfth of a revolution, and the coil C is again receiving a double current, as in the first instance, but its polarity is of the opposite sign to what it then was.

When the polarity of the brushes is reversed, (which can be easily done by means of an ordinary commutator-switch,) the motion of the armature will also be reversed. Fig. 2 shows the armature-magnet A at the point of changing its polarity. If the armature turns to the right, C is on the point of getting the double current which is just leaving B, while if the polarity of the brushes were to be reversed, so as to cause the armature to turn to the left, B would be on the point of receiving the double current just leaving C. The armature thus receives twelve impulses in each revolution.

There is no dead-point, because even during the brief interval which occurs just before a magnet changes its polarity a path is open to the current through the other two coils, thus tending to produce rotary motion.

Having thus described the principle of my invention as adapted to the employment of three armature-magnets and four field pole-pieces, it will readily be understood that the same principle is equally applicable to other numbers of armature and field magnets in which the armature has one more or one less coil than the number of pole-pieces of the field-magnets. In all cases the number of commutator-brushes employed corresponds with the number of pole-pieces of the field-magnets.

Fig. 7 represents a combination of five armature-magnets with four pole-pieces. In this case, instead of the armature-coils receiving four times in each revolution a double current, each of the coils remains four times in a revolution unexcited during a twentieth of the revolution. Referring to diagram No. 1 of this figure, the ends of the armature-coils being fixed as before, the outer ones to segments $a'$, $b'$, $c'$, $d'$, and $e'$, and the inner ones to segments $a$, $b$, $c$, $d$, and $e$, and calling the magnets belonging to the respective segments A, B, C, D, and E, it will be seen that magnet A becomes negative, magnet B positive, magnet C negative, magnet D positive, and magnet E is at rest, being unexcited by any current. The commutator having turned one-twentieth of a revolution, as shown in diagram No. 2, magnet E becomes positive, magnet A negative, magnet B positive, magnet C negative, and magnet D is at rest. The contacts of the brushes with the commutator are represented by the vertical lines 1, 2, 3, and 4.

In the case where the number of armature-coils is greater by one than the number of field-magnet poles there is an angular displacement or shifting round the axis of the two series of segments of the commutator, so that the segments belonging to the same coil are moved away from each other, while in cases where the armature-coils are fewer by one than the field-poles the displacement takes place in the opposite direction, taking as the starting-point in both cases such a position that the end of a segment in one series is in a line with the commencement of a segment in the other series. In the former case the segments remain intact and their number in each series is only of the number of armature-coils employed, while in the second case the segments are divided and connected in the manner shown in Fig. 5. There are in consequence in the latter case apparently double the number of segments in each series, though in reality, taking into consideration how they are connected, their number is the same as that of the coils.

The amount of angular displacement of the segments necessarily depends on the numbers employed. In the case of four field-poles and three armature-coils the difference between one-third and one-fourth of the whole length is one-twelfth, which is the amount of displacement, and as there are six segments in each series the commencement of a segment in one series is just opposite the middle of a segment in the other series, as shown in Figs. 5 and 6.

Fig. 8 refers to a combination of five armature-coils with six field-poles. In diagram No. 1 of this figure, calling the magnets connected with the segments, $a\ a'$, $b\ b'$, $c\ c'$, $d\ d'$, and $e\ e'$, respectively A, B, C, D, and E, the magnet A receives a double current and is negative, B is positive, C negative, D negative, and E positive. Shifting the commutator one-thirtieth of a revolution, as shown in diagram No. 2, magnet A is negative, B is positive and receives a double current, C is negative, D positive, and E positive. The contacts of the brushes with the commutator are represented by the vertical lines 1, 2, 3, 4, 5, and 6.

Fig. 9 refers to seven armature-coils and eight field-poles. The angular displacement is one fifty-sixth of the whole length. Calling the magnets connected with the segments, $a\ a'$, $b\ b'$, $c\ c'$, $d\ d'$, $e\ e'$, $f\ f'$, and $g\ g'$, respectively A, B, C, D, E, F, and G, the magnet A has a double current and is negative, B is positive, C negative, D positive, E positive, F negative, and G positive. It is clear that after the commutator has turned one-eighth of a revolution all the seven coils will have received in their turn the double current, and all the coils will now be of the opposite polarity to what they were at the commencement. The contacts of the brushes with the commutator are represented by the vertical lines 1, 2, 3, 4, 5, 6, 7, and 8.

It will be readily understood that by doubling the original number of the armature-coils, the segments in the commutator, the pole-pieces of the field magnets, and the commutator brushes, the angular displacement of the segments of the commutator remaining the same, the action and changes above described will take place simultaneously in the two halves of the armature, thereby forming a double machine, in each half of which a similar action will take place to that which occurs in the arrangements above described. Or, instead of doubling the armature-coils, segments, pole-pieces, and brushes, any other multiple of the original number may be employed, and a similar action will result in each of the parts or sections as originally formed and heretofore described.

I wish it to be understood that I do not confine myself to any particular form of field-magnets. They may be of the shape shown in Fig. 2, or of a ring form, as shown in Fig. 10, or they may be straight magnets with polar extensions, as shown in Fig. 11, or of any other suitable form, and they may be connected up either in series or in multiple arc.

It will be also understood that the magnets of the revolving armature, instead of being of T form, as shown, may be of any other suitable form, the ends of the wires of the armature-coils being connected to the commutator in the manner described.

As a motor, by reversing the action, becomes a generating-machine, or vice versa, and as I do not confine myself to any particular form of magnets and coils, it will be readily seen that the commutator and the arrangement of brushes, as described, are equally applicable to generating-machines in which the number of armature-coils is either one more or one less than the number of field pole-pieces.

Having now described the nature of my invention and the manner of carrying the same into effect, what I claim is—

1. The combination, with that class of electromotors in which there are as many contact-brushes employed as there are pole-pieces in the field-magnets and the number of armature-coils is one less than the number of field-poles, of a commutator consisting of two series of segments, upon both of which each brush bears simultaneously, the number of segments being four times the number of armature-coils employed, four segments in two pairs belonging to each armature-coil, and being so connected and having such an angular displacement in relation to each other as to insure the current being taken off by a negative brush from a segment belonging to one pair and being in one series when a positive brush bears on a segment of the other pair in the other series, substantially as and for the purpose specified.

2. The combination, with that class of electromotors in which there are as many contact-brushes employed as there are pole-pieces in the field-magnets, and the number of armature-coils is one more than the number of field-poles, of a commutator consisting of two series of segments, upon both of which each brush bears simultaneously, each series containing the same number of segments as there are armature-coils, the inner end of each successive coil being connected to successive segments in one series and the outer end of such coils to successive segments in the other series, and the two series of segments having such an angular displacement in relation to each other, that when a brush of one sign bears on a segment in one series which is connected to one end of any given coil a brush of the opposite sign is bearing on that segment in the other series to which the other end of the same coil is connected, substantially as and for the purpose specified.

3. The commutator, having two series of segments connected to the armature-coils in the manner described, the two series having an angular displacement in relation to each other depending upon the number of field-poles and armature-coils employed, the amount of such angular displacement being the reciprocal of the product of the number of armature-coils, into the number of field-poles, or, expressed as an arc, is equal to $\frac{360}{A \times F}$ where A equals the number of armature-coils and F equals the number of field-poles, substantially as and for the purpose specified.

MORITZ IMMISCH.

Witnesses:
HERBERT JOHN ALLISON,
JOHN DEAN.